United States Patent
Steiman et al.

(10) Patent No.: US 11,915,406 B2
(45) Date of Patent: Feb. 27, 2024

(54) GENERATING TRAINING DATA USABLE FOR EXAMINATION OF A SEMICONDUCTOR SPECIMEN

(71) Applicant: Applied Materials Israel Ltd., Rehovot (IL)

(72) Inventors: Matan Steiman, Tel-Aviv (IL); Shalom Elkayam, Ramla (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 0 days.

(21) Appl. No.: 17/886,191

(22) Filed: Aug. 11, 2022

(65) Prior Publication Data
US 2022/0383488 A1    Dec. 1, 2022

Related U.S. Application Data

(63) Continuation of application No. 16/942,677, filed on Jul. 29, 2020, now Pat. No. 11,449,977.

(51) Int. Cl.
| | | |
|---|---|---|
| G06N 20/00 | (2019.01) | |
| G06F 17/18 | (2006.01) | |
| G06F 18/24 | (2023.01) | |
| G06N 3/047 | (2023.01) | |
| G06N 3/048 | (2023.01) | |
| G06T 7/00 | (2017.01) | |
| G06T 7/10 | (2017.01) | |

(52) U.S. Cl.
CPC ............ *G06T 7/0004* (2013.01); *G06F 17/18* (2013.01); *G06F 18/24* (2023.01); *G06N 3/047* (2023.01); *G06N 3/048* (2023.01); *G06N 20/00* (2019.01); *G06T 7/10* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

2017/0357895 A1 * 12/2017 Karlinsky ................ G06N 3/08
2018/0330178 A1 * 11/2018 el Kaliouby ...... B60W 60/0051

* cited by examiner

*Primary Examiner* — Idowu O Osifade
(74) *Attorney, Agent, or Firm* — Lowenstein Sandler LLP

(57) ABSTRACT

Provided is a system and method of generating training data for training a Deep Neural Network usable for examination of a semiconductor specimen. The method includes: obtaining a first training image and first labels respectively associated with a group of pixels selected in each segment, extract a set of features characterizing the first training image, train a machine learning (ML) model using the first labels, values of the group of pixels, and the feature values of each of the set of features corresponding to the group of pixels, process the first training image using the trained ML model to obtain a first segmentation map, and determine to include the first training image and the first segmentation map into the DNN training data upon a criterion being met, and to repeat the extracting of the second features, the training and the processing upon the criterion not being met.

20 Claims, 10 Drawing Sheets

GENERATING TRAINING DATA USABLE FOR EXAMINATION OF A SEMICONDUCTOR SPECIMEN

RELATED APPLICATIONS

This application is a continuation of U.S. patent application Ser. No. 16/942,677 filed Jul. 29, 2020, the entire contents of which is incorporated by reference herein.

TECHNICAL FIELD

The presently disclosed subject matter relates, in general, to the field of examination of a semiconductor specimen, and more specifically, to training data generation usable for the examination of a specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

By way of non-limiting example, run-time examination can employ a two-phase procedure, e.g. inspection of a specimen, followed by review of sampled locations of potential defects. Examination generally involves generating certain output (e.g., images, signals, etc.) for a specimen by directing light or electrons to the wafer and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having high probability of a defect. Most often, the goal of inspection is to provide high sensitivity to detect defects of interest, while suppressing detection of nuisance and noise on the wafer. During the second phase, at least some of the suspected locations are more thoroughly analyzed with relatively high resolution. In some cases, both phases can be implemented by the same inspection tool, and, in some other cases, these two phases are implemented by different inspection tools.

Examination processes can include a plurality of examination steps. During the manufacturing process, the examination steps can be performed a multiplicity of times, for example after the manufacturing or processing of certain layers, or the like. Additionally or alternatively, each examination step can be repeated multiple times, for example for different wafer locations or for the same wafer locations with different examination settings.

Examination processes are used at various steps during semiconductor fabrication to detect and classify defects on specimens, as well as perform metrology related operations. Effectiveness of examination can be increased by automatization of process(es) as, for example, defect detection, Automatic Defect Classification (ADC), Automatic Defect Review (ADR), image segmentation, automated metrology-related operations, etc.

SUMMARY

In accordance with certain aspects of the presently disclosed subject matter, there is provided a computerized system of generating training data for training a Deep Neural Network (DNN training data) usable for examination of a semiconductor specimen, the system comprising a processor and memory circuitry (PMC) configured to: obtain a first training image representative of at least a portion of the semiconductor specimen, and first labels respectively associated with a group of pixels selected in each of one or more segments identified by a user from the first training image; extract a set of features characterizing the first training image, each feature having feature values corresponding to pixels in the first training image, the set of features including first features informative of contextual relations between the one or more segments in the first training image, and second features informative of pixel distribution in the first training image relative to a statistical measure of the group of pixels in each segment; train a machine learning (ML) model using the first labels, values of the group of pixels selected in each segment associated with the first labels, and the feature values of each feature of the set of features corresponding to the group of pixels in each segment, wherein the ML model is trained for image segmentation; process the first training image using the trained ML model to obtain a first segmentation map informative of predicted labels associated with respective pixels in the first training image, each predicted label indicative of a segment that a respective pixel belongs to; and determine to include a first training sample comprising the first training image and the first segmentation map into the DNN training data upon a criterion being met, and to repeat the extracting of the second features, the training and the processing upon the criterion not being met.

In addition to the above features, the system according to this aspect of the presently disclosed subject matter can comprise one or more of features (i) to (xi) listed below, in any desired combination or permutation which is technically possible:

(i). The training data can be usable for training a Deep Neural Network (DNN) for at least one examination process selected from a group comprising: automated segmentation, automated metrology, automated defect detection, automated defect review, and automated defect classification based on runtime images.

(ii). The criterion is based on a user feedback on the first segmentation map, and the PMC is configured to, upon receiving a negative user feedback on the first segmentation map, obtain additional first labels associated with an additional group of pixels in at least one of the segments, the first labels and the additional first labels constituting aggregated label data, and repeat the extracting of the second features, the training and the processing based on the aggregated label data until receiving a positive user feedback.

(iii). The PMC is configured to, upon receiving a positive user feedback on the first segmentation map, include the first training sample into the training data.

(iv). The PMC is further configured to obtain a second training image and second labels respectively associated with a group of pixels selected in each of one or more segments identified by a user from the second training image, the second labels being added to the aggregated label data, extract a set of features characterizing the second training image and including the first features and the second features, train the ML model using the aggregated label data, values of pixels associated with the aggregated label data, and the feature values of each feature of the set of features corresponding to the pixels associated with the aggregated label data, and performing the processing and determining based on the second training image.

(v). At least one of the one or more segments correspond to one or more structural elements presented in the first training image.

(vi). The first features include texture features extracted by: processing the first training image with a set of filters, giving rise to a set of feature responses each comprising feature response values corresponding to respective pixels of the first training image, wherein each pixel corresponds to a feature vector including a set of feature response values thereof; clustering the feature vectors which correspond to the pixels in the first training image into a plurality of clusters; assigning, for each pixel, a feature value according to the cluster that the feature vector thereof belongs to, giving rise to a feature map comprising feature values corresponding to pixels of the first training image, the feature map separable into a plurality of channels corresponding to respective feature values; and sampling each channel of the feature map using a sampling filter, giving rise to a feature map with a plurality of sampled channels.

(vii). The first features further include intensity features extracted by: clustering pixel values of the first training image into a plurality of clusters, assigning, for each pixel, a feature value according to the cluster that the pixel value belongs to, giving rise to a feature map separable into a plurality of channels corresponding to respective feature values, and sampling each channel of the feature map using a sampling filter, giving rise to a feature map with a plurality of sampled channels.

(viii). The set of filters comprise one or more of the following: derivative filters, Gabor filters and Laplacian filters.

(ix). The second features are extracted by calculating a statistical measure for the group of pixels in each segment, and for each pixel in the first training image, calculating a corresponding feature value as a distance between a value of the pixel and the statistical measure of each segment, giving rise to one or more feature maps, each comprising feature values corresponding to distances between pixel values and the statistical measure of a respective segment.

(x). The training image comprises multiple channels captured from different perspectives, and the set of features is extracted from the multiple channels.

(xi). The PMC is further configured to use the DNN training data to train the DNN, and validate the trained DNN using a validation set of images.

In accordance with other aspects of the presently disclosed subject matter, there is provided a method for generating training data for training a Deep Neural Network (DNN training data) usable for examination of a specimen, the method performed by a processor and memory circuitry (PMC) and comprising: obtaining a first training image representative of at least a portion of the semiconductor specimen, and first labels respectively associated with a group of pixels selected in each of one or more segments identified by a user from the first training image; extracting a set of features characterizing the first training image, each feature having feature values corresponding to pixels in the first training image, the set of features including first features informative of contextual relations between the one or more segments in the first training image, and second features informative of pixel distribution in the first training image relative to a statistical measure of the group of pixels in each segment; training a machine learning (ML) model using the first labels, values of the group of pixels selected in each segment associated with the first labels, and the feature values of each feature of the set of features corresponding to the group of pixels in each segment, wherein the ML model is trained for image segmentation; processing the first training image using the trained ML model to obtain a first segmentation map informative of predicted labels associated with respective pixels in the first training image, each predicted label indicative of a segment that a respective pixel belongs to; and determining to include a first training sample comprising the first training image and the first segmentation map into the DNN training data upon a criterion being met, and to repeat the extracting of the second features, the training and the processing upon the criterion not being met.

This aspect of the disclosed subject matter can comprise one or more of features (i) to (xi) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method for generating training data for training a Deep Neural Network (DNN training data) usable for examination of a specimen, the method comprising: obtaining a first training image representative of at least a portion of the semiconductor specimen, and first labels respectively associated with a group of pixels selected in each of one or more segments identified by a user from the first training image; extracting a set of features characterizing the first training image, each feature having feature values corresponding to pixels in the first training image, the set of features including first features informative of contextual relations between the one or more segments in the first training image, and second features informative of pixel distribution in the first training image relative to a statistical measure of the group of pixels in each segment; training a machine learning (ML) model using the first labels, values of the group of pixels selected in each segment associated with the first labels, and the feature values of each feature of the set of features corresponding to the group of pixels in each segment, wherein the ML model is trained for image segmentation; processing the first training image using the trained ML model to obtain a first segmentation map informative of predicted labels associated with respective pixels in the first training image, each predicted label indicative of a segment that a respective pixel belongs to; and determining to include a first training sample comprising the first training image and the first segmentation map into the DNN training data upon a criterion being met, and to repeat the extracting of the second features, the training and the processing upon the criterion not being met.

This aspect of the disclosed subject matter can comprise one or more of features (i) to (xi) listed above with respect to the method, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
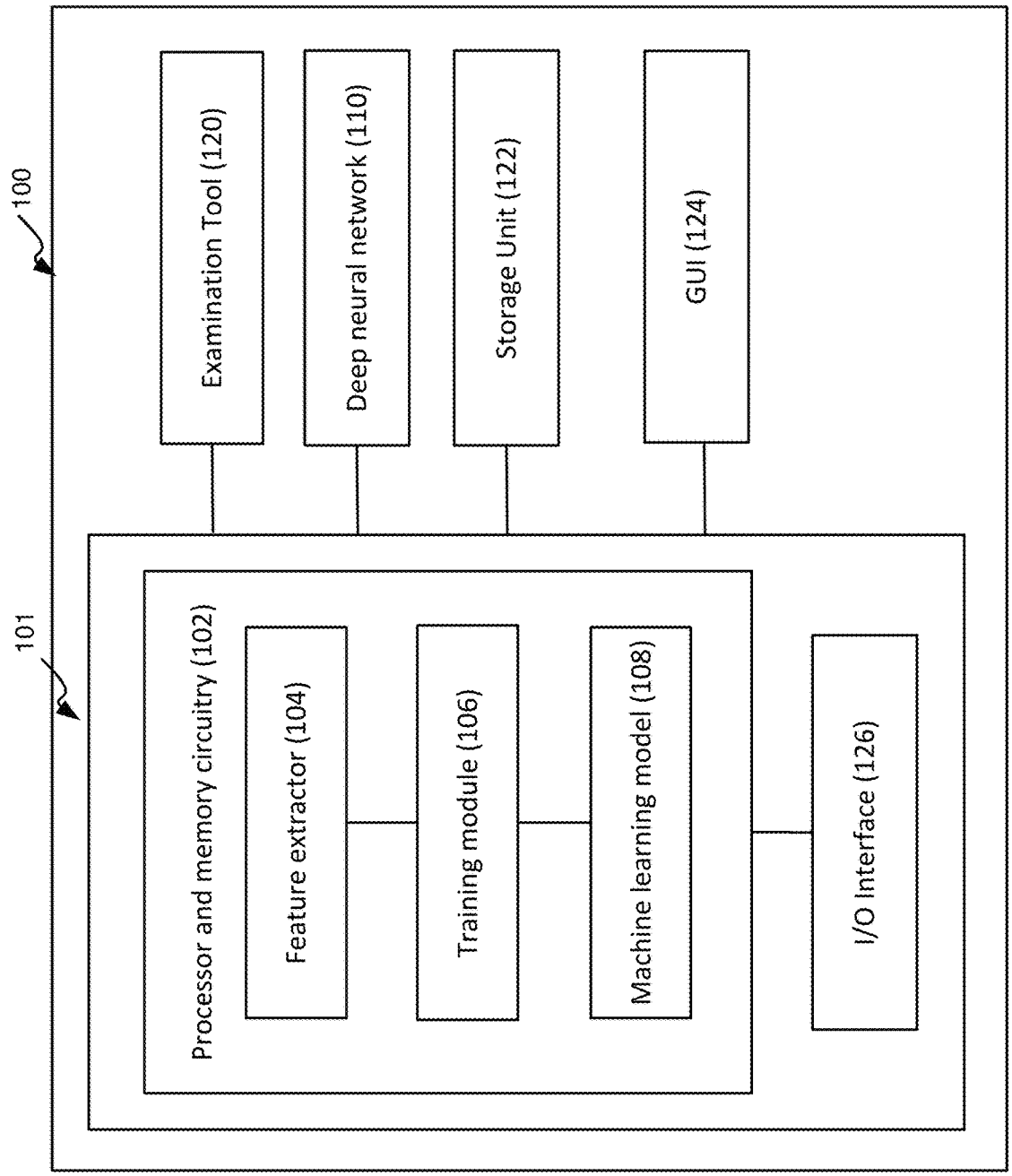
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "generating", "training", "obtaining", "extracting", "processing", "determining", "repeating", "including", "receiving", "clustering", "assigning", "sampling", "calculating", "using", "validating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the training data generation system and respective parts thereof disclosed in the present application.

The term "examination" used in this specification should be expansively construed to cover any kind of metrology-related operations, as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g. of a wafer and/or parts thereof) as part of the specimen fabrication process. The illustrated examination system 100 comprises a computer-based system 101 capable of automatically determining metrology-related and/or defect-related information using images obtained during specimen fabrication (referred to hereinafter as fabrication process (FP) images). According to certain embodiments of the presently disclosed subject matter, system 101 can be configured to generate training data for training a Deep Neural Network (DNN) usable for examination of a semiconductor specimen. System 101 is thus also referred to as a training system or a training data generation system in the present disclosure. System 101 can be operatively connected to one or more examination tools 120. The examination tools 120 are configured to capture FP images and/or to review the captured FP image(s) and/or to enable or provide measurements related to the captured image(s).

By way of example, FP images can be selected from images of a specimen (e.g. wafer or parts thereof) captured during the manufacturing process, derivatives of the captured images obtained by various pre-processing stages (e.g. images of a part of a wafer or a photomask captured by a scanning electron microscope (SEM) or an optical inspection system, SEM images roughly centered around the defect to be classified by ADC, SEM images of larger regions in which the defect is to be localized by ADR, registered images of different examination modalities corresponding to the same mask location, segmented images, height map images, etc.) and computer-generated design data-based images. It is to be noted that in some cases the images can include image data (e.g. captured images, processed images, etc.) and associated numeric data (e.g. metadata, hand-crafted attributes, etc.). It is further noted that image data can include data related to a layer of interest and/or to one or more other layers of the specimen.

The term "examination tool(s)" used herein should be expansively construed to cover any tools that can be used in examination-related processes, including, by way of non-limiting example, imaging, scanning (in a single or in multiple scans), sampling, reviewing, measuring, classifying and/or other processes provided with regard to the specimen or parts thereof. The one or more examination tools 120 can include one or more inspection tools and/or one or more review tools. In some cases, at least one of the examination tools 120 can be an inspection tool configured to scan a specimen (e.g., an entire wafer, an entire die or portions thereof) to capture inspection images (typically, at relatively high-speed and/or low-resolution) for detection of potential defects. In some cases, at least one of the examination tools 120 can be a review tool, which is configured to capture review images of at least some of the defects detected by inspection tools for ascertaining whether a potential defect is indeed a defect. Such a review tool is usually configured to inspect fragments of a die, one at a time (typically, at relatively low-speed and/or high-resolution). The inspection tool and review tool can be different tools located at the same or at different locations, or a single tool operated in two different modes. In some cases, at least one examination tool can have metrology capabilities and can be configured to perform metrology measurements on the FP images.

Without limiting the scope of the disclosure in any way, it should also be noted that the examination tools 120 can be implemented as inspection machines of various types, such as optical imaging machines, electron beam inspection machines, and so on. In some cases, the same examination tool can provide low-resolution image data and high-resolution image data.

System 101 includes a processor and memory circuitry (PMC) 102 operatively connected to a hardware-based I/O interface 126. PMC 102 is configured to provide processing necessary for operating the system as further detailed with reference to FIGS. 2A and 2B and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

According to certain embodiments, functional modules comprised in PMC 102 can include a feature extractor 104, a training module 106, and a machine learning model 108. The PMC 102 can be configured to obtain, via I/O interface 126, a first training image representative of at least a portion of the semiconductor specimen, and first labels respectively associated with a group of pixels selected in each of one or more segments identified by a user from the first training image. The feature extractor 104 can be configured to extract a set of features characterizing the first training image. Each feature in the set has feature values corresponding to pixels in the first training image. The set of features includes first features informative of contextual relations between the one or more segments in the first training image, and second features informative of pixel distribution in the first training image relative to a statistical measure of the group of pixels in each segment. The training module 106 can be configured to train a machine learning model 108 using the first labels, values of the group of pixels selected in each segment associated with the first labels, and the feature values of each feature of the set of features corresponding to the group of pixels selected in each segment. The trained machine learning model 108 can be used to process the first training image to obtain a first segmentation map informative of predicated labels associated with respective pixels in the first training image, each predicted label indicative of a segment to which a respective pixel belongs. The training module 106 can be further configured to determine to include a first training sample comprising the first training image and the first segmentation map into the training data (i.e., the training data for training a Deep Neural Network (DNN), also referred to herein as DNN training data) upon a criterion being met, and repeat the extracting of the second features, the training and the processing upon the criterion not being met. Details of the training data generation process are described below with reference to FIGS. 2A and 2B.

In certain embodiments, the DNN training data as generated by the training system 101 can be used to train a DNN 110 usable for examining a semiconductor specimen. In some cases, the DNN can be comprised in the PMC 102 of system 101, or alternatively be operatively connected to system 101, as illustrated in FIG. 1. DNN 110 can be configured to enable data processing using deep neural network(s) for outputting application-related data based on the fabrication input data. In one embodiment, the specific application can be image segmentation, and the application-related output can be segmentation maps corresponding to the input FP images. Operation of system 101, PMC 102 and the functional modules therein will be further detailed with reference to FIGS. 2A and 2B.

DNN 110 can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a deep neural network can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved.

A set of DNN input data used to adjust the weights/thresholds of a deep neural network is referred to hereinafter as DNN training data. As aforementioned, system 101 is configured to generate such DNN training data usable for training the DNN.

It is noted that the teachings of the presently disclosed subject matter are not bound by specific architecture of the DNN as described above.

In some embodiments, the DNN can be a segmentation DNN configured to perform image segmentation on FP images. In some cases, additionally to DNN 110, the examination system 100 can comprise one or more examination modules, such as, e.g., defect detection module and/or Automatic Defect Review Module (ADR) and/or Automatic Defect Classification Module (ADC) and/or a metrology-related module and/or other examination modules which are usable for examination of a semiconductor specimen. The one or more examination modules can be implemented as stand-alone computers, or their functionalities (or at least part thereof) can be integrated with the examination tool 120. In some cases, the DNN 110 can be comprised in the one or more examination modules. Optionally, DNN 110 can be shared between the examination modules or, alternatively, each of the one or more examination modules can comprise its own DNN 110.

According to certain embodiments, system 101 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images and/or derivatives thereof produced by the examination tool 120. Accordingly, the one or more images can be retrieved from the storage unit 122 and provided to the PMC 102 for further processing.

In some embodiments, system 101 can optionally comprise a computer-based Graphical User Interface (GUI) 124 which is configured to enable user-specified inputs related to system 101. For instance, the user can be presented with a visual representation of the specimen (for example, by a display forming part of GUI 124), including image data of the specimen. The user may be provided, through the GUI, with options of defining certain operation parameters. For instance, the user can provide label data by manually annotating on the image. The user may also view the operation results, such as, e.g., segmentation maps, on the GUI.

As will be further detailed with reference to FIGS. 2A and 2B, system 101 is configured to receive, via I/O interface 126, FP input data. FP input data can include data (and/or derivatives thereof and/or metadata associated therewith) produced by the examination tools 120 and/or data stored in one or more data depositories. It is noted that in some cases FP input data can include image data (e.g. captured images, images derived from the captured images, simulated images, synthetic images, etc.) and associated numeric data (e.g. metadata, hand-crafted attributes, etc.). It is further noted that image data can include data related to a layer of interest and/or to one or more other layers of the specimen. In some embodiments of the present disclosure, for training purposes, FP input data can include one or more training images for the purpose of generating training data usable for training a DNN.

System 101 is further configured to process the received FP input data and send, via I/O interface 126, the results (or part thereof) to the storage unit 122, and/or the DNN 110, and/or GUI 124 (for rendering the results).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least some of examination tools 120, storage unit 122 and/or GUI 124 can be external to the examination system 100 and operate in data communication with system 101 via I/O interface 126. System 101 can be implemented as stand-alone computer(s) to be used in conjunction with the examination tools. Alternatively, the respective functions of the system 101 can, at least partly, be integrated with one or more examination tools 120, thereby facilitating and enhancing the functionalities of the examination tools 120 in examination-related processes.

For purpose of illustration only, the following description is provided for generating DNN training data for training a DNN usable for examination of a semiconductor specimen. Those skilled in the art will readily appreciate that the teachings of the presently disclosed subject matter are applicable to various types of machine learning models and to various examinations such as, for example, segmentation, defect detection, ADR, ADC, an automated navigation module, metrology-related module, and alike.

Figure 2A:
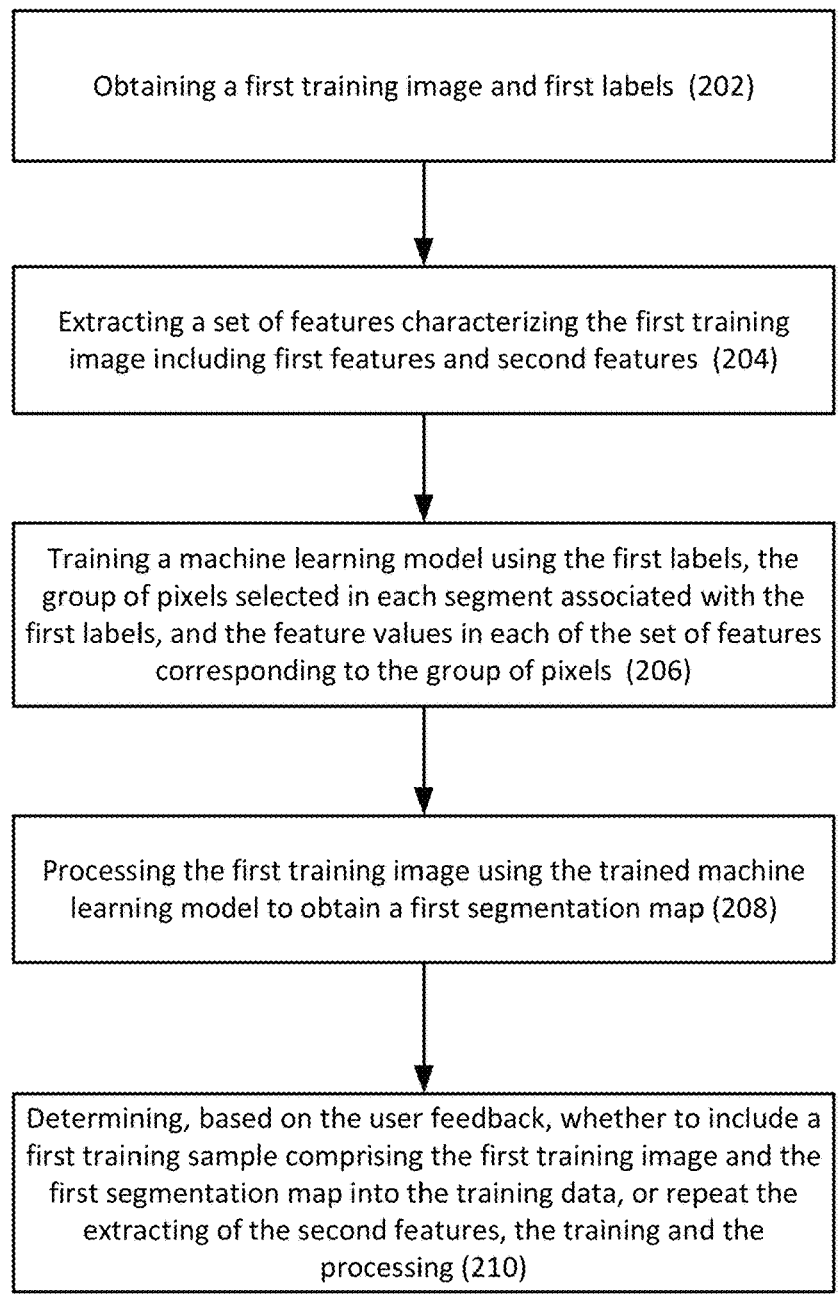
FIG. 2A illustrates a generalized flowchart of generating training data for training a DNN usable for examination of a semiconductor specimen in accordance with certain embodiments of the presently disclosed subject matter.

Referring to FIG. 2A, there is illustrated a generalized flowchart of generating training data for training a DNN usable for examination of a semiconductor specimen in accordance with certain embodiments of the presently disclosed subject matter.

According to certain embodiments, training data used for training a DNN (also referred to as DNN training data) can include a plurality of training samples, each including a respective training image and corresponding ground truth data associated therewith. Ground truth data can include label data indicative of application-specific information. By way of example, for the application of image segmentation, each training sample can include a training image of the semiconductor specimen and label data indicative of one or more segments in the training image.

A training image can be a "real world" image of a semiconductor specimen obtained in a fabrication process thereof (e.g., an FP image as described above). By way of non-limiting example, the image can be an inspection image obtained by examining a specimen using one or more inspection tools (typically at relatively high-speed and/or relatively low-resolution) for detection of potential defects. Such inspection tools can be, e.g. an optical inspection system, a low-resolution SEM, etc. Alternatively, the image can be a review image obtained by examining the specimen at a subset of potential defect locations using one or more review tools (typically at relatively low-speed and/or relatively high-resolution), for ascertaining whether a potential defect detected by the inspection tools is indeed a defect. Such review tools can be, e.g., a scanning electron microscope (SEM), etc.

Ground truth data can be obtained in various ways. By way of example, ground truth data can be produced by human annotation, synthetically produced (e.g. CAD-based images), generated by machine-learning annotation (e.g. labels based on feature extracting and analysis), or a combination of the above, etc.

According to certain embodiments, the DNN is trained for a specific application of image segmentation on semiconductor specimen images (e.g., the FP images). The term "segmentation" used herein may refer to any process of partitioning an image into meaningful parts/segments (for example, background and foreground, noisy and non-noisy areas, structural elements, defect and non-defect, etc.) whilst providing per-pixel or per-region values indicative of such segments. The DNN training data as generated in accordance with the presently disclosed subject matter is used for training the DNN usable for segmentation of FP images.

By way of example, the training image can be a SEM image or derivatives thereof, and the label data can be a segmentation map (also termed as segmentation mask) corresponding to the SEM image. The segmentation map is informative of predicted labels associated with corresponding pixels in the training image. Each predicted label is indicative of a segment in the image to which a respective pixel belongs.

The segmentation map is conventionally generated by a user manually annotating on the entire training image. The manual annotation process is extremely time-consuming considering the size and resolution of the image, and the annotated result is sometimes inaccurate and error-prone. This is not desired by the user since the quality of the label data directly affects the training process and the performance of the trained DNN. Accordingly, the present disclosure proposes a more efficient way of automatically generating accurate label data usable for training the DNN, as described below with reference to FIGS. 2A and 2B.

According to certain embodiments, a first training image representative of at least a portion of the semiconductor specimen can be obtained (202) (e.g., by the PMC 102 via I/O interface 126), together with first labels respectively associated with a group of pixels selected in each of one or more segments identified by a user from the first training image. In some cases, at least one of the one or more segments correspond to one or more structural elements presented in the first training image.

Figure 5:
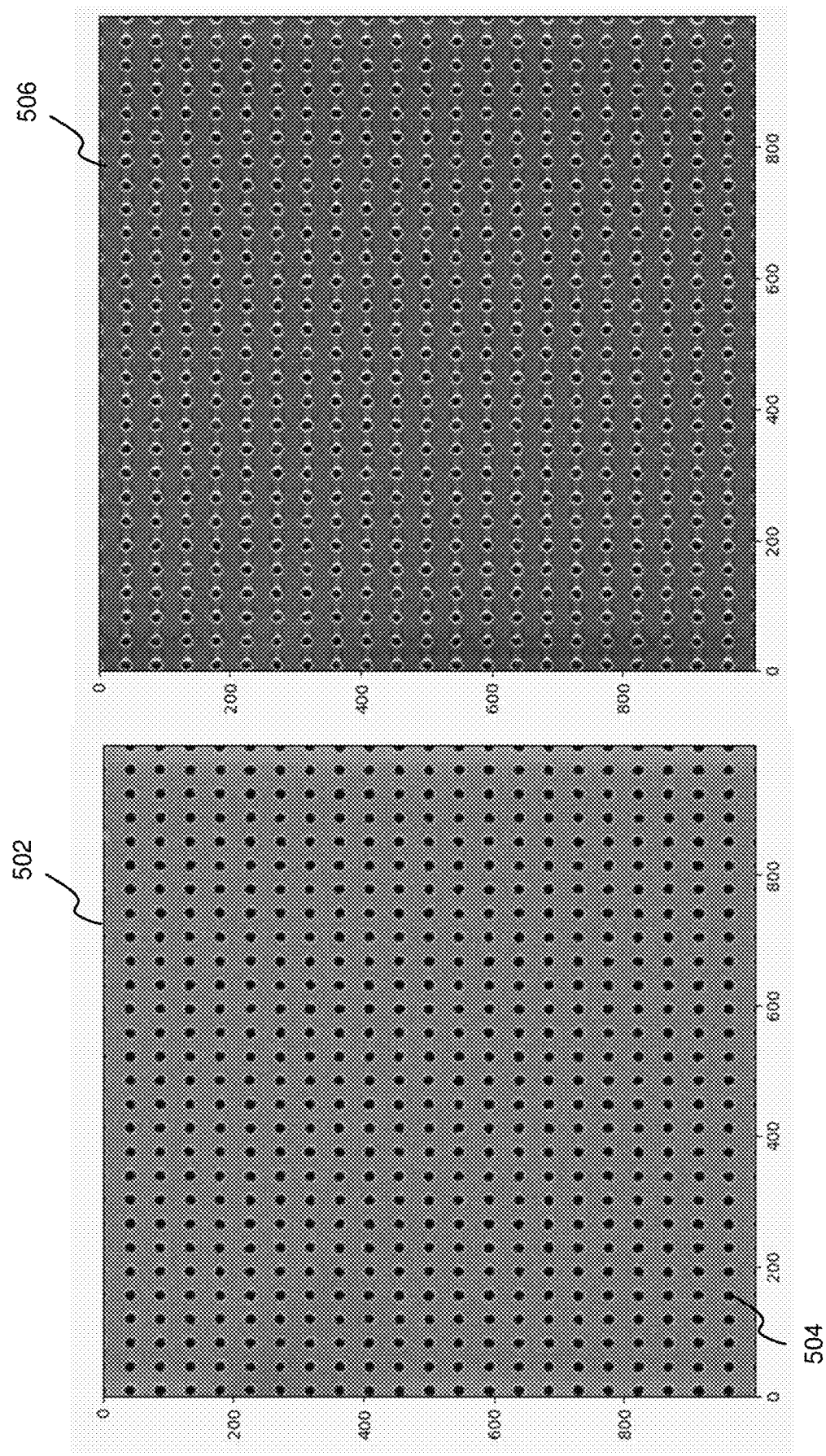
FIG. 5 illustrates an example of a training image in accordance with certain embodiments of the presently disclosed subject matter.

Turning now to FIG. 5, there is illustrated an example of a training image in accordance with certain embodiments of the presently disclosed subject matter. The training image 502 is exemplified as a SEM image captured by a SEM review tool and representing a part of a die of a wafer. As shown, there are a plurality of structural elements 504 (illustrated as polygons representing the elements of contact on the wafer) presented in the image. A structural element used herein can refer to any original object on the image data that has a geometrical shape or geometrical structure with a contour, in some cases combined with other object(s). A structural element can be presented, e.g., in the form of a polygon.

In some embodiments, a training image can comprise multiple channels captured from different perspectives. For instance, in the example of FIG. 5, 502 can represent one channel of the image taken from a perpendicular perspective by a top detector of the examination tool, and 506 can represent another channel of the image taken by a side detector of the examination tool from a side perspective. In some cases, there can be more than one side detector from different angles, and accordingly the training image can comprise multiple side-channel images 506. In some cases, the multiple side-channel images can be combined into one combined side-channel image.

Figure 6:
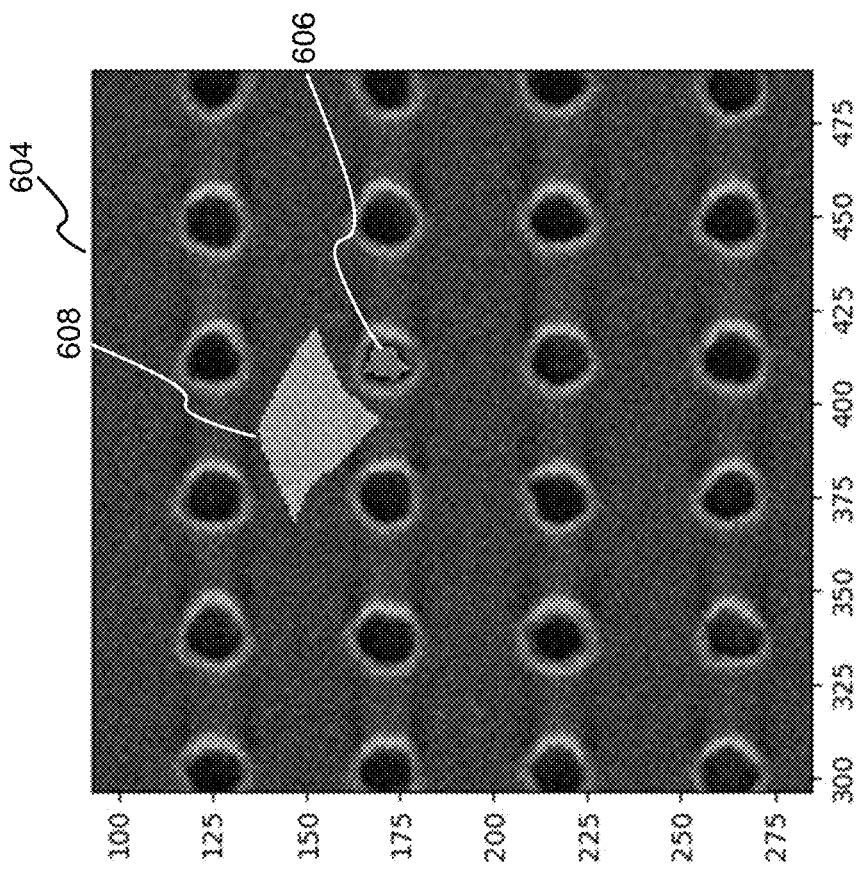
FIG. 6 illustrates an example of partial user annotation on a training image in accordance with certain embodiments of the presently disclosed subject matter.
Figure 6:
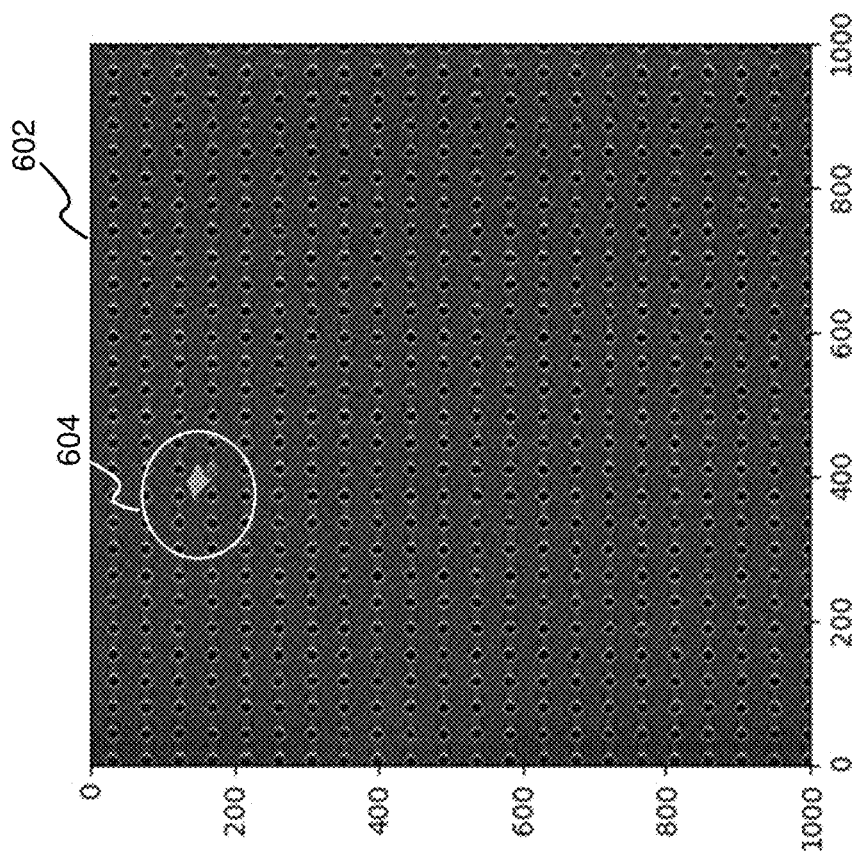

In order to save the user's efforts of full annotation of an entire image, partial label data associated with the training image can be provided by the user. By way of example, the user can determine one or more segments that he/she expects to identify in the segmentation map, select a group of pixels from each of the segments, and annotate the group of pixels to be indicative of the segment to which they belong. FIG. 6 illustrates an example of partial user annotation on a training image in accordance with certain embodiments of the presently disclosed subject matter.

A training image 602 is exemplified in FIG. 6. The training image 602 captures the same site of the wafer as the training images 502 and 506 in FIG. 5 and comprises a plurality of structural elements that share the same design pattern. Such structural elements are also referred to as equivalent structural elements. By way of example, the user can determine that the structural elements can belong to one segment, and the background belongs to another segment. Thus the user can select a few pixels from either segment and mark them to be indicative of a respective segment. By way of example, as shown in the circled area 604 in FIG. 6 (a zoom-in view of 604 is illustrated on the right), a group of pixels 606 within a structural element is marked by the user with a specific gray level value indicating that they belong to one segment representing the structural elements, and another group of pixels 608 in the background is marked by the user with another gray level value indicating that they belong to another segment representing the background area. The user annotation on the selected pixels in each segment can be used as the partial label data for training a machine learning model, as described below with respect to block 206.

It is to be noted that the user can determine different types of segmentation in the training image that he/she would want to be included in the segmentation map. By way of example, in some cases the training image may include more than one family of equivalent structural elements. The user can determine that each family of equivalent structural elements belong to a respective segment, or, alternatively, he/she may determine all the structural elements belong to one segment, while the background belongs to a different segment. By way of another example, the user may decide on the segments in accordance with gray level variance in the image. For instance, there may be a gray level contrast within one structural element due to the specific structure profile, and the user may determine to have two segments within each structural element to correspond to the gray level separation. The present disclosure is not limited by the specific way of segmentation and the number of segments on the training image.

Continuing with the description of FIG. 2A, a set of features characterizing the first training image can be extracted (204) (e.g., by the feature extractor 104). Each feature has feature values corresponding to pixels in the first training image. The set of features can include first features indicative of contextual information or representation in the first training image. For instance, the first features can be informative of contextual relations/relationships between the one or more segments in the first training image. The set of features can further include second features informative of pixel distribution in the first training image relative to a statistical measure of the group of pixels in each segment.

The first features are also referred to herein as contextual features. The term contextual features should be broadly construed to represent the context (e.g., the surrounding region possibly with different ranges) of a specific item/element in the image, such as, e.g., pixels, structural elements or segments, etc., and/or a global contextual relation between such elements or segments in the image. The contextual relations can be reflected in terms of relative texture, spatial layout, intensity, etc., between the elements or segments. For instance, pixels within a structural element share similar texture as their surrounding pixels (surrounding but still within the structural element), whereas the texture of pixels outside of the structural element is considerably different from the pixels within the structural element, which indicate that the pixels within and those outside a structural element can belong to different segments. In some embodiments, the first features can include texture features. In some cases, the first features can further include intensity features.

Figure 3A:
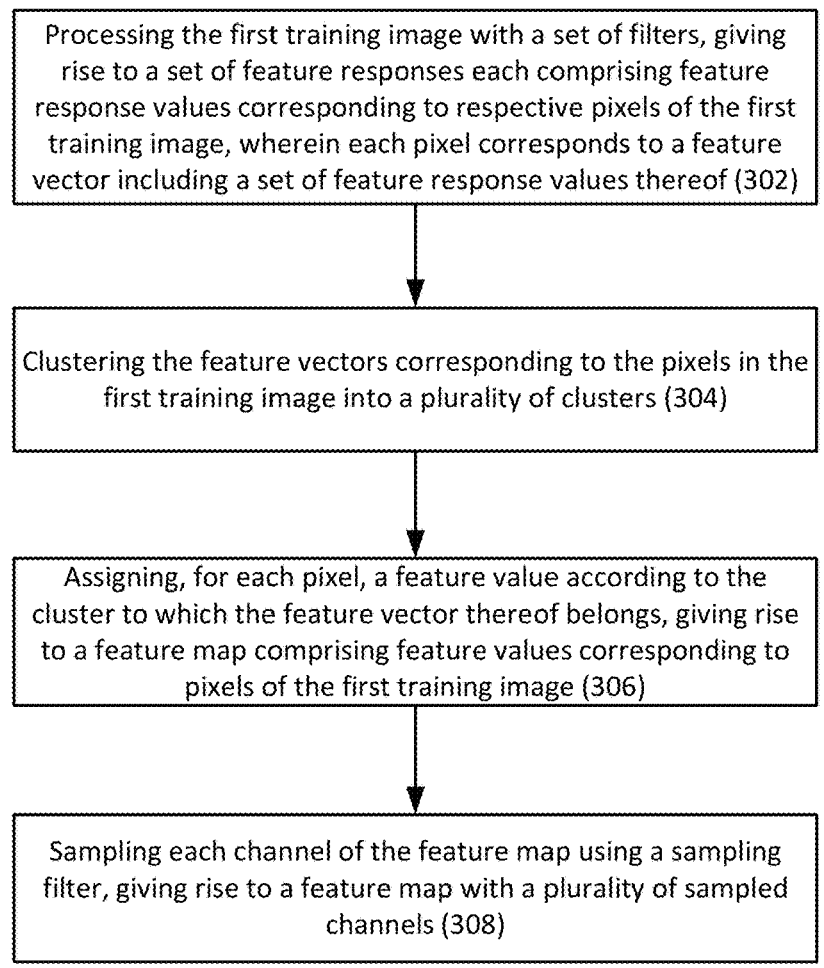
FIG. 3A illustrates a generalized flowchart of extracting texture features from the first training image in accordance with certain embodiments of the presently disclosed subject matter.

The texture features can be used to represent the perceived texture of an image. For instance, such features can be representative of spatial arrangement of structures or patterns characterizing different elements or segments in the image. Turning now to FIG. 3A, there is illustrated a generalized flowchart of extracting texture features from the first training image in accordance with certain embodiments of the presently disclosed subject matter.

The first training image can be processed (302) with a set of filters (also termed as a filter bank), giving rise to a set of feature responses corresponding to the set of filters. Each feature response comprises feature response values corresponding to respective pixels of the first training image. Each pixel corresponds to a feature vector including a set of feature response values. The feature vectors that correspond to the pixels in the image can be clustered (304) into a plurality of clusters. A feature value can be assigned (306) for each pixel according to the cluster that the feature vector thereof belongs to, giving rise to a feature map comprising feature values corresponding to pixels of the first training image. The feature map is separable into a plurality of channels corresponding to respective feature values. Each channel of the feature map can be sampled (308) using a sampling filter, giving rise to a feature map with a plurality of sampled channels.

In some embodiments, the texture features can be implemented as texton features. The term texton generally refers to fundamental micro-structures in images. Textons can provide compact representation for the range of different appearances of an object/element, and can be effective in categorizing textures as well as generic object classes.

By way of example, the first training image can be convolved with a set of filters, e.g., a multi-dimensional filter bank, giving rise to multi-dimensional feature responses for all pixels in the training image. The set of filters can be selected to extract features representative of a semiconductor image. For instance, the set of filters can include various families of filters, such as, e.g., derivative filters, Gabor filters and Laplacian filters. Derivative filters can provide a quantitative measurement for the rate of change in pixel brightness information present in an image. Through convolution with the image, the derivative filters can produce derivatives in different directions and scales, depending on the choice of kernels. The resulting information on brightness change rates can be used to enhance contrast, detect edges and boundaries, and to measure feature orientation. A Gabor filter is a linear filter that analyzes whether there is any specific frequency content in the image in specific directions in a localized region around the point or region of interest. Frequency and orientation representations of Gabor filters are similar to those of the human visual system. A set of Gabor filters with different frequencies and orientations can be used for extracting texture-representative features from the first training image. The Laplacian filter is also termed as Laplacian of Gaussian (LoG) filter. It is a measure of the second spatial derivative of an image. The Laplacian of an image highlights regions of rapid intensity change and can be used for edge detection. For instance, in areas where the image has a constant intensity (i.e. where the intensity gradient is zero), the LoG response will be zero. In the vicinity of a change in intensity, however, the LoG response will be positive on the darker side, and negative on the lighter side.

In some embodiments of the present disclosure, the three families of filters can be used in combination, and it is proven by the present disclosure that the combined filter set is more reliable in extracting features representative of the texture and layout of the structures in semiconductor images which are normally noisy images with poor Signal-to-noise Ratio (SNR) and Contrast-to-noise Ratio (CNR). However, this is by no means to limit the present disclosure in any way. Other families/types of filters or filters with similar functionalities can be used in addition to or in lieu of the above. In particular, it is to be noted that the specific filters in each family as described above are illustrated for exemplary purposes. Other suitable filters in the family can be used in addition to or in lieu of the above. The present disclosure is not limited by the specific types of filters and the number of filters used in each family.

By way of example, assuming the training image is in the dimension of M*N, and the set of filters include F filters, i.e., a F-dimensional filter bank, a multi-dimensional feature responses will be generated, e.g., in the form of a feature matrix with a dimension of M*N*F. That is to say, for each pixel in the training image, there are F feature responses forming a feature vector corresponding to the pixel. The multi-dimensional feature responses, i.e., the feature matrix of M*N*F, can be regarded as comprising M*N feature vectors corresponding to the M*N pixels.

Once the multi-dimensional feature responses for all pixels in the training image are obtained, clustering (e.g., an unsupervised clustering) can be performed on the multi-dimensional feature responses. By way of example, a Euclidean-distance K-means clustering algorithm can be performed on the M*N feature vectors, giving rise to a plurality of clusters (e.g., K clusters) of feature vectors. Each pixel in the training image is clustered into one of the K clusters and assigned with a feature value corresponding to the cluster number, giving rise to a feature map (e.g., a texton map) comprising feature values corresponding to pixels of the first training image. The texton map T comprises feature values where for each pixel i the corresponding feature value $Ti \in \{1, \ldots, K\}$. The feature map (e.g., texton map) can be separated into K channels corresponding to respective feature values (e.g., one for each texton), where for each channel, a separate channel map (e.g., an integral map) can be derived, similarly as a histogram with one bin for each texton. The separated channel maps are in the dimension of M*N*K.

Sampling can be performed on each channel, e.g., by using a sampling filter. For instance, the K channel maps can be respectively convolved with the sampling filter, giving rise to sampled channel maps. By way of example, the sampling filter can be implemented using averaging, Gaussian, or other kinds of sampling methods. When being convolved with the channel map, it can effectively reflect the contextual situation of each pixel (e.g., the surrounding area of each pixel) in the resulting convolved value in the sampled channel maps, thereby adding sensitivity to the sampled maps. The K sampled channel maps (e.g., in the form of a feature matrix in the dimension of M*N*K) can be used as the texture features corresponding to the first training image.

According to certain embodiments, the first features can further include intensity features, in addition to the texture features. The intensity features can be representative of spatial arrangement of pixel intensities characterizing different elements or segments in the image. In some embodiments, the intensity features can also be implemented as texton features. By way of example, the clustering as described above can be performed on the pixel values of the first training image. Similarly, each pixel in the training image is clustered into one of the plurality of clusters and can be assigned with a feature value corresponding to the cluster to which the pixel value belongs, giving rise to a feature map which can separated into a plurality of channels. Sampling can be performed on each channel, e.g., by using a sampling filter, and the sampled channel maps can be used as the intensity features corresponding to the first training image.

Figure 7:
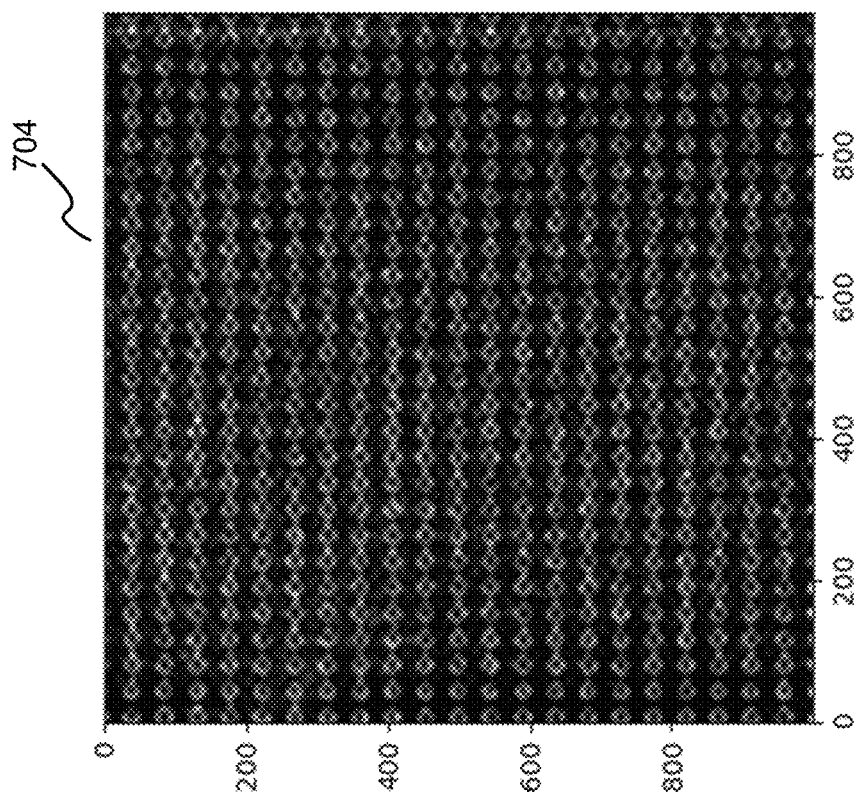
FIG. 7 illustrates an example of a texture feature and an example of an intensity feature in accordance with certain embodiments of the presently disclosed subject matter.
Figure 7:
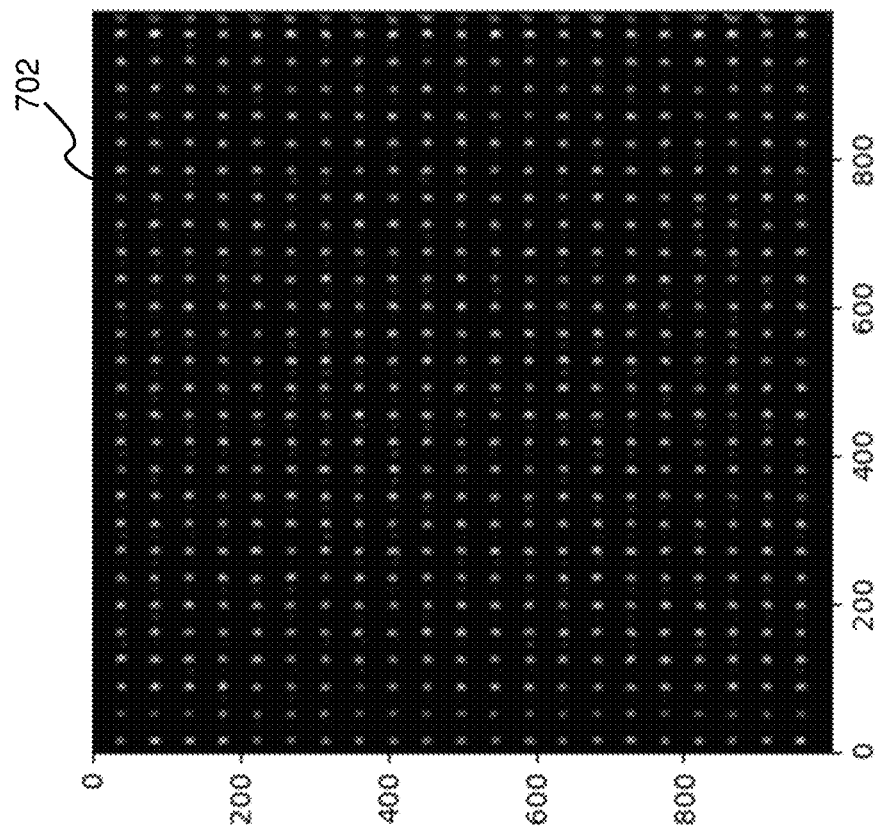

Turning now to FIG. 7, there are illustrated an example of a texture feature and an example of an intensity feature in accordance with certain embodiments of the presently disclosed subject matter. As shown, the feature map 702 is a texture feature extracted from the first training image 502, and the feature map 704 is an intensity feature extracted from the same image.

Figure 3B:
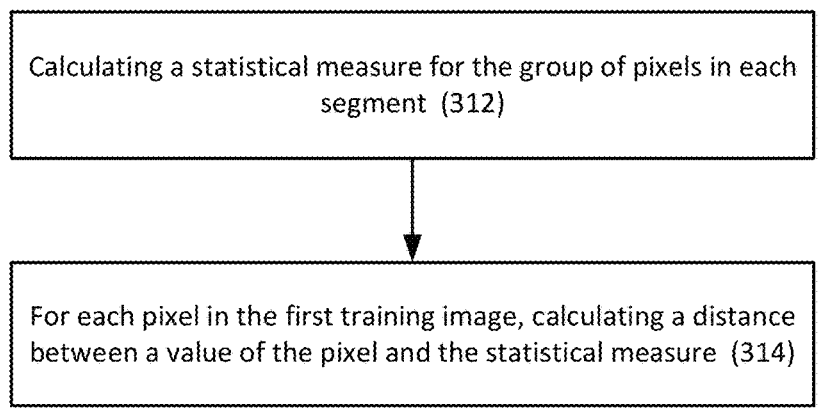
FIG. 3B illustrates a generalized flowchart of extracting statistical features from the first training image in accordance with certain embodiments of the presently disclosed subject matter.

In addition to the first features, the set of features can further include second features informative of pixel distribution in the first training image relative to a statistical measure of the group of pixels in each segment. The second features are also referred to as statistical features. Statistical features referred to herein can represent a quantitative measure according to statistical significance of the pixels, the quantitative measure indicative of likeliness of the pixels belonging to specific segments. Referring to FIG. 3B, there is illustrated a generalized flowchart of extracting statistical features from the first training image in accordance with certain embodiments of the presently disclosed subject matter.

A statistical measure can be calculated (312) for the group of pixels selected in each segment. By way of example, the statistical measure can be the mean value calculated based on the values of the group of pixels in each segment. By way of another example, the statistical measure can be calculated based on the mean value and the standard deviation (STD) which measures the amount of variation or dispersion of the values of the group of pixels with respect to the mean value. For each pixel in the first training image, a corresponding feature value can be calculated (314) as the distance between a value of the pixel and the statistical measure of each segment, giving rise to one or more feature maps, each comprising feature values corresponding to distances between pixel values and the statistical measure of a respective segment. For instance, in the example of FIG. 6, a statistical measure can be calculated respectively for the group of pixels 606 in the segment representing the structural elements and the group of pixels 608 in the other segment representing the background area. Two feature maps can be generated for the first training image, the first one comprising the distance values between each pixel value in image 602 and the statistical measure calculated for 606, and the second one comprising the distance values between each pixel value in image 602 and the statistical measure calculated for 608. The feature maps generated in such a way are therefore indicative of the pixel value distribution/variance in the image as relative to the statistical measure calculated for each segment (based on the group of pixels marked by the user), which indicate how likely the pixels belong to the specific segments.

Continuing with the description of FIG. 2A, upon obtaining the first training image and the first labels as described with reference to block 202, and obtaining the set of features as described with reference to block 204, a machine learning (ML) model can be trained (206) (e.g., by the training module 106) using the first labels, values of the group of pixels selected in each segment associated with the first labels, and the feature values of each feature of the set of features corresponding to the group of pixels in each segment. The ML model is trained for image segmentation.

In some embodiments, the ML model can be implemented as a classifier. The term "classifier", "classifier model" or "classification model" referred to herein should be broadly construed to cover any learning model capable of identifying to which of a set of categories/classes a new instance belongs, on the basis of a training set of data. By way of example, in the present disclosure, the classifier can be trained to classify the pixel candidates into a set of segment classes as defined by the user. For instance, in the example of FIG. 6, the classifier is trained based on the training set including: the first labels indicative of two segments (e.g., the user annotation on the group of pixels 606 representing one segment and the user annotation on the group of pixels 608 representing the other segment), the pixel values of the group of pixels 606 and the group of pixels 608 in the first training image, and the feature values (in each feature of the set of features) corresponding to the group of pixels 606 and the group of pixels 608. For example, assuming the set of features includes a texture feature as exemplified in 702, an intensity feature as exemplified in 704, and a statistical feature as described above with reference to FIG. 3B, the feature values in each of the three features (which are in the form of feature maps or feature matrices) that correspond to the selected groups of pixels 606 and 608 are used as part of the training set.

The trained classifier can be used for image segmentation, i.e., for providing a predicted label for each pixel in an image indicating the segment to which it belongs. It is to be noted that the classifier can be implemented as various types of machine learning models, such as, e.g., Linear classifiers, Support vector machines (SVM), neural networks, decision trees, etc., and the present disclosure is not limited by the specific model implemented therewith.

The first training image can be processed (208) using the trained ML model to obtain a first segmentation map informative of predicted labels associated with respective pixels in the first training image. Each predicted label is indicative of a segment to which a respective pixel belongs. According to certain embodiments, the trained ML model (e.g., the classifier) can be used to process at least the remaining pixels in the first training image (e.g., excluding the group of pixels selected in each segment and used for training of the classifier). The output of the classifier is a segmentation map (also termed as segmentation mask), in the same size as the training image, and containing predicted labels for corresponding pixels in the image.

It is determined (210) (e.g., by the training module 106) to include a first training sample comprising the first training image and the first segmentation map into the DNN training data upon a criterion being met, and to repeat the extracting of the second features, the training and the processing, upon the criterion not being met. In other words, it can be determined, based on a criterion, whether to include the first training sample in the DNN training data, or to repeat the process, as described above. In some embodiments, the criterion can relate to a feedback on the first segmentation map, e.g., by the user. By way of example, the criterion can be based on a user feedback. For instance, the criterion can be a positive user feedback on the first segmentation map, e.g., the first segmentation map has a satisfying quality. Thus, upon receiving a positive user feedback on the first segmentation map, the first training sample can be included into the DNN training data.

Figure 8:
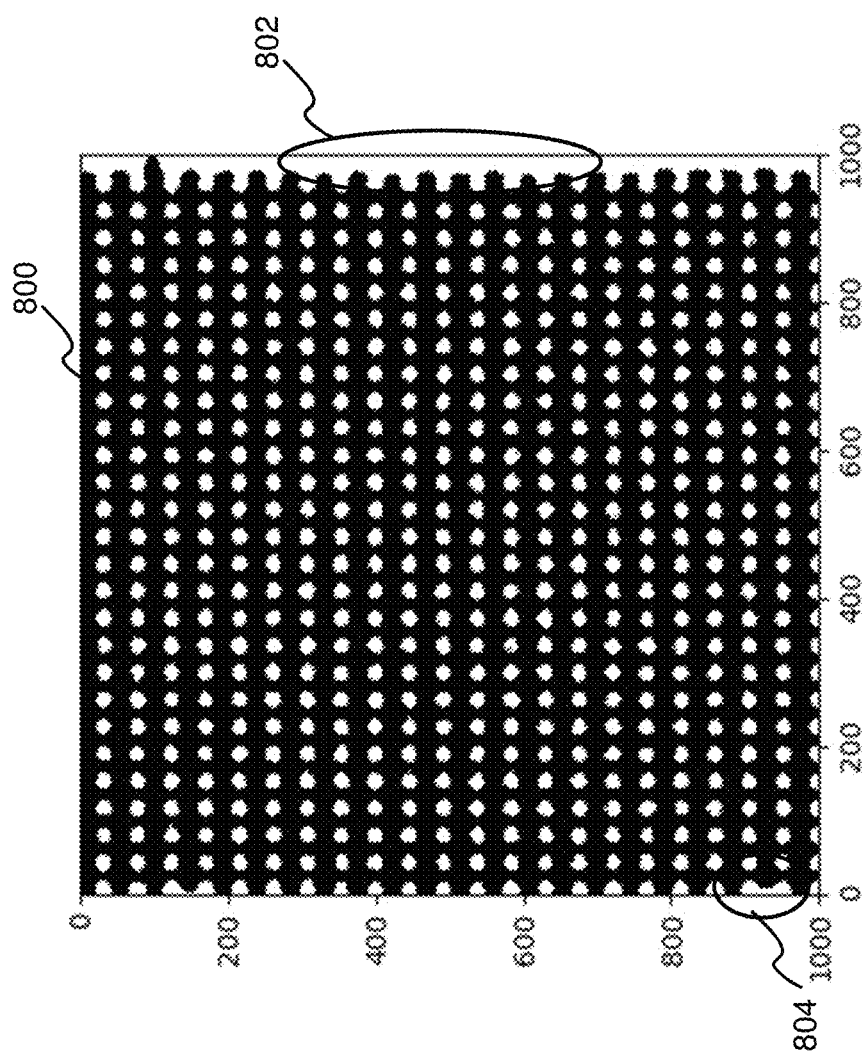
FIG. 8 illustrates an example of a segmentation map with negative user feedback in accordance with certain embodiments of the presently disclosed subject matter.

Whereas, upon receiving a negative user feedback on the first segmentation map, e.g., the quality of the first segmentation map is not satisfying, it means the ML model as currently trained has not learned to segment the first training image as well as the user expected, thus at least part of the operations described above with reference to FIG. 2A need to be repeated. FIG. 8 illustrates an example of a segmentation map with negative user feedback in accordance with certain embodiments of the presently disclosed subject matter.

The segmentation map 800 is generated corresponding to the training images as exemplified in FIGS. 5 and 6. In the present example, the segmentation map is exemplified as a binary map representing two segments, the first segment corresponding to the structural elements in the image (illustrated as white circles representing the contact elements), and the second segment corresponding to the background area (illustrated as black area). As shown, for area 802 which is a marginal background region along the boundary of the image, it should have been marked in black, yet however is marked mistakenly in white. Thus area 802 has been predicted erroneously as belonging to the first segment of the structural elements. For area 804, a similar error occurs where a background area between two structural elements has been erroneously predicted as belonging to the first segment (shown in the figure as two elements connecting with each other, thus missing the background area in between). Such a segmentation map, as per the user's review, is not satisfying due to the mis-segmented areas. Accordingly, the classifier needs to be re-trained until it generates an output segmentation map with a satisfying quality. It is to be noted that in some cases the satisfying quality of the segmentation map can be determined in accordance with a quality condition. For instance, the quality condition can be a range or a threshold of percentage of pixels with correct segmentation.

Figure 2B:
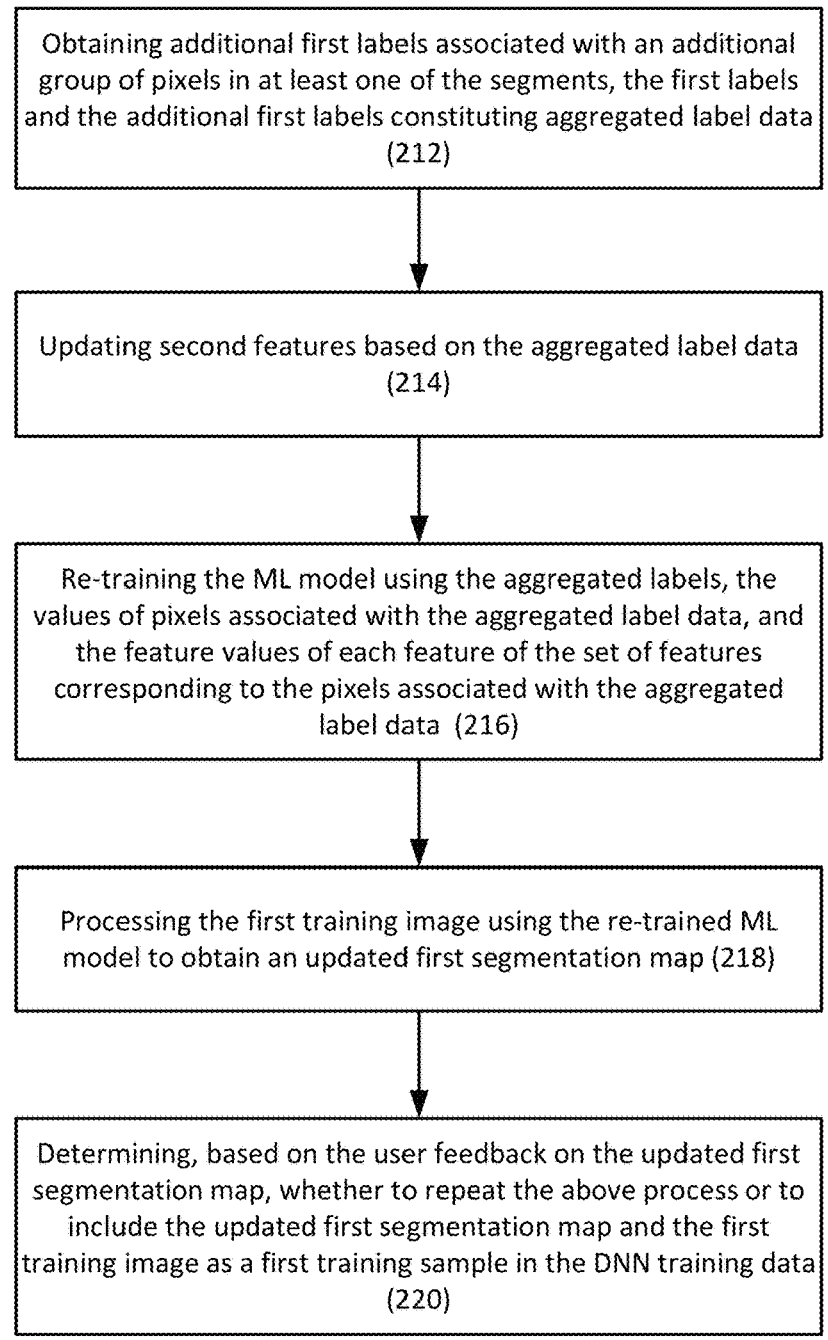
FIG. 2B illustrates a generalized flowchart of a continued process of DNN training data generation upon receiving a negative user feedback on the first segmentation map in accordance with certain embodiments of the presently disclosed subject matter.

Turning now to FIG. 2B, there is illustrated a generalized flowchart of a continued process of DNN training data generation upon receiving a negative user feedback on the first segmentation map in accordance with certain embodiments of the presently disclosed subject matter.

Specifically, additional first labels, associated with an additional group of pixels in at least one of the segments, can be obtained (212) from the user. In such cases, the additional first labels can be added as part of the label data, together with the first labels as previously provided by the user. The first labels and the additional first labels constitute aggregated label data. Referring to FIG. 9A, there is illustrated an example of additional first labels provided by the user in accordance with certain embodiments of the presently disclosed subject matter.

As shown in the first training image 602 in FIG. 9A, in addition to the original first labels (as shown in the circled area 604), an additional group of pixels (shown in the circled areas 902 and 904) are marked by the user with labels indicative of the expected segments to which these pixels belong. For instance, the user can mark in particular the areas where there was mis-segmentation in the first segmentation map (e.g., in areas 802 and 804). The user can choose to mark the additional pixels in one segment, or in both segments. For example, in 902 the user marked pixels in both a structural element and the background, while in 904 the user only marked pixels in the background. Therefore, after additional marking, the aggregated label data include the labels marked for the groups of pixels in areas 604, 902 and 904.

Upon obtaining the aggregated label data, the extracting of the second features, the training and the processing can be repeated based on the aggregated label data until the criterion is met, e.g., receiving a positive user feedback. Specifically, since the label data has been updated, the second features, i.e., the statistical features, which are calculated based on the group of pixels in each segment that are associated with labels, should also be updated (214) based on the aggregated label data. For instance, the second features can be re-extracted using a statistical measure calculated based on pixel values of the group of pixels and the additional group of pixels.

The classifier can be re-trained (216) using the aggregated labels, the values of pixels associated with the aggregated label data, and the feature values of each feature of the set of features corresponding to the pixels associated with the aggregated label data. The first training image can be processed (218) again using the re-trained classifier to obtain an updated first segmentation map. It can be then determined (220), based on the user feedback on the updated first segmentation map, whether to repeat the above process (the operations with reference to blocks 212-218), or to include the updated first segmentation map and the first training image as a first training sample in the DNN training data.

Figure 9B:
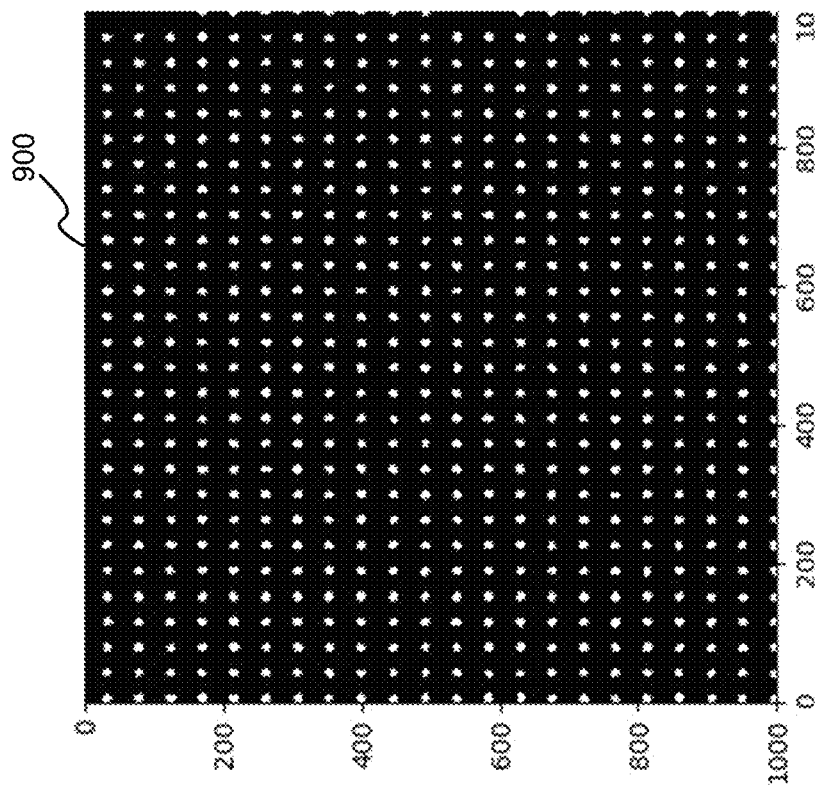
FIG. 9B illustrates an example of an updated segmentation map with positive user feedback in accordance with certain embodiments of the presently disclosed subject matter.
Figure 9A:
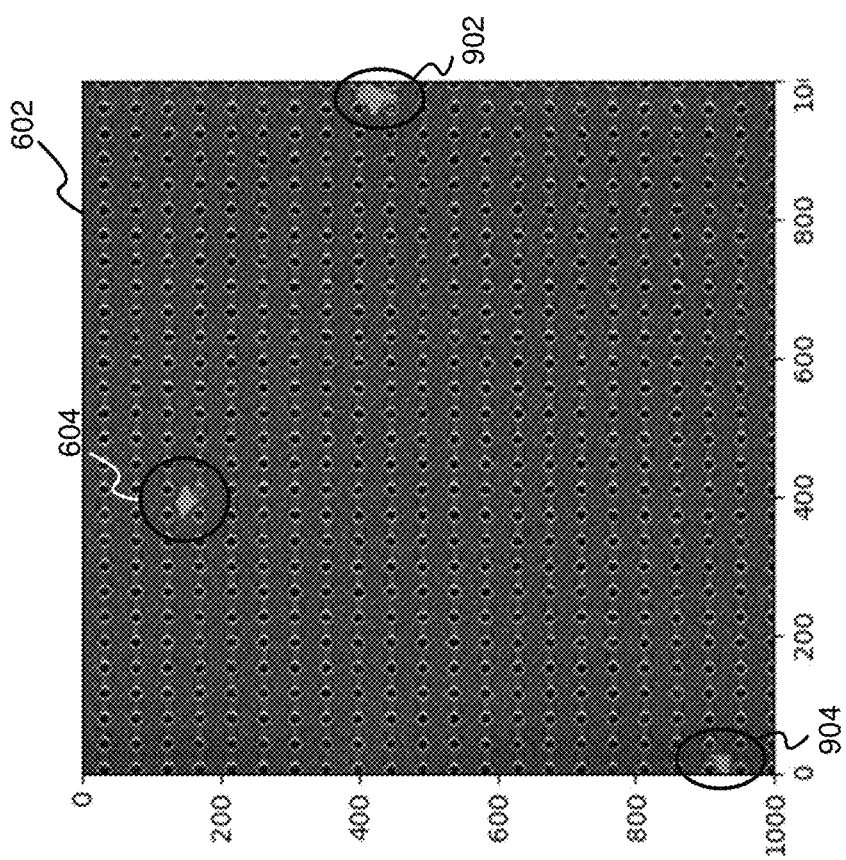
FIG. 9A illustrates an example of additional first labels provided by the user in accordance with certain embodiments of the presently disclosed subject matter.

Referring to FIG. 9B, there is illustrated an example of an updated segmentation map with positive user feedback in accordance with certain embodiments of the presently disclosed subject matter.

The segmentation map 900 is generated in accordance with the operations described with reference to FIG. 2B, upon obtaining the additional first labels as illustrated in FIG. 9A. It is an updated segmentation map of the first segmentation map 800 as illustrated in FIG. 8. As shown, the updated segmentation map 900 provides satisfying segmentation results of the two segments, contrary to the segmentation map 800. The segmentation in the previous mis-segmented areas 802 and 804 is fixed by virtue of the additional first labels provided by the user and the re-training of the classifier. The updated segmentation map, together with the corresponding training image, are included as a training sample in the DNN training data.

According to certain embodiments, the process as illustrated in FIGS. 2A and 2B can be repeated for one or more training images, so as to generate one or more segmentation maps, which, together with the training images, can be included in the DNN training data. By way of example, a second training image can be obtained, together with second labels respectively associated with a group of pixels selected in each of one or more segments identified by a user from the second training image. The second labels are added to the aggregated label data. A set of features characterizing the second training image can be extracted, which includes the first features and the second features. The machine learning model can be trained using the aggregated label data, values of pixels associated with the aggregated label data, and the feature values of each feature of the set of features corresponding to pixels associated with the aggregated label data. The processing and determining as described above with reference to blocks 208 and 210 can be performed based on the second training image.

Figure 4:
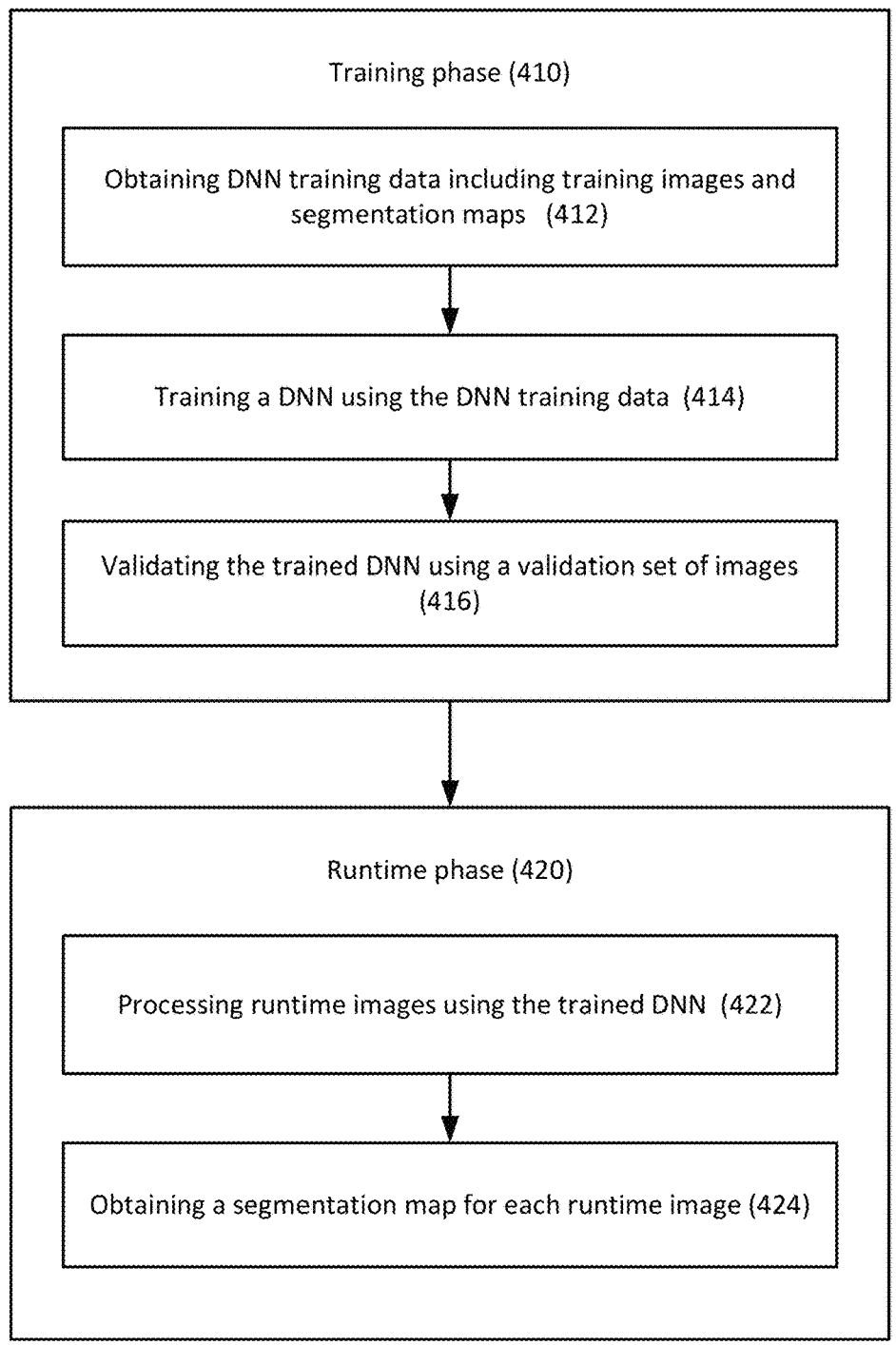
FIG. 4 illustrates a generalized flowchart of using the generated DNN training data for training a DNN in accordance with certain embodiments of the presently disclosed subject matter.

Turning now to FIG. 4, there is illustrated a generalized flowchart of using the generated DNN training data for training a DNN in accordance with certain embodiments of the presently disclosed subject matter.

According to certain embodiments, the DNN is trained for a specific application of image segmentation on semiconductor specimen images (e.g., the FP images). By way of example, such segmentation can be used by metrology tools for performing measurements on the specimen. By way of another example, it can also be usable for ADC when constructing attributes (e.g. for defining if the defect is on the main pattern, on the background, or both), for ADR for applying segment-specific detection thresholds on each segment, etc.

The process comprises a setup phase 410 of segmentation-specific training of DNN and runtime phase 420 of using the trained DNN for image segmentation.

During the setup 410, the DNN training data as generated in accordance with the description of FIGS. 2A and 2B can be obtained (412). The DNN training data comprise one or more training samples, each including a training image and a corresponding segmentation map. The DNN training data can be used to train (414) the DNN, thereby obtaining a trained DNN characterized by segmentation-related training parameters. In some embodiments the training process can be cyclic, and can be repeated several times until the DNN is sufficiently trained. By way of example, the DNN can be trained using a cost function related to segmentation accuracy (e.g., correct segmentation label map vs. predicted label map). The trained DNN can be validated (416) using a validation set of images. The validation set of images can be a different image set from the training image set and can comprise FP images selected for validation purposes. A user can provide feedback for the results reached by the DNN during the validation.

During runtime 420, PMC uses the trained DNN to process (422) one or more runtime images comprising one or more captured FP images to be segmented in order to provide (424) a segmentation map for each image. The one or more FP images can be obtained by the same or by different examination modalities. The obtained segmentation map can be informative of per-pixel or per-region segmentation labels indicative of different segments on the image. By way of example, the polygons on one layer can have one segmentation label, and the polygons on another layer can have a different segmentation label, while the background can have a separate segmentation label.

Among advantages of certain embodiments of the training data generation process as described herein is that it provides an automatic means of generating accurate ground truth data usable for training a DNN, as compared to the conventional manual annotation on an entire training image which is time-consuming and error-prone. The automation of such a process is enabled at least by extracting meaningful features suitable for segmentation, and the interactive training of the ML model based on user partial annotation and feedback.

Among further advantages of certain embodiments of the training data generation process as described herein is that by extracting and using both contextual features and statistical features characterizing the training image, the present disclosure manages to provide a reliable representation of the semiconductor image in terms of texture, layout, context, and statistical significance, etc., thus being able to train the ML model using the representative features and generate a segmentation map in an efficient manner, with a satisfying outcome.

It is to be noted that the illustrated examples are described herein for illustrative purposes, and should not be regarded as limiting the present disclosure in any way. Other suitable examples can be used in addition to, or in lieu of, the above.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system of generating training data for training a Deep Neural Network (DNN training data) usable for examination of a semiconductor specimen, the system comprising a processor and memory circuitry (PMC) configured to:
   obtain a first training image of the semiconductor specimen, and first labels respectively associated with a group of pixels selected in each of one or more segments identified by a user from the first training image, the first labels provided as partial label data of the first training image;
   extract a set of features characterizing the first training image, each feature having feature values corresponding to pixels in the first training image, the set of features including first features indicative of contextual information in the first training image, and second features informative of pixel distribution in the first training image relative to a statistical measure of the group of pixels in each segment;
   train a machine learning (ML) model for image segmentation using the first labels, values of the group of pixels selected in each segment, and the feature values of each feature of the set of features corresponding to the group of pixels in each segment;
   process the first training image using the trained ML model to obtain a first segmentation map informative of predicted labels associated with respective pixels in the first training image, each predicted label indicative of a segment to which a respective pixel belongs; and
   determine to include a first training sample comprising the first training image and the first segmentation map into the DNN training data upon a criterion being met, wherein the first segmentation map is used as full label data of the first training image.

2. The computerized system according to claim 1, wherein the training data is usable for training a Deep Neural Network (DNN) for at least one examination process selected from a group comprising: automated segmentation, automated metrology, automated defect detection, automated defect review, and automated defect classification, based on runtime images.

3. The computerized system according to claim 1, wherein the first features are representative of context of one or more elements in the first training image and contextual relations between the one or more elements.

4. The computerized system according to claim 1, wherein the criterion is based on a user feedback on the first segmentation map, and the PMC is configured to, upon receiving a negative user feedback on the first segmentation map, obtain additional first labels associated with an additional group of pixels in at least one of the segments, the first labels and the additional first labels constituting aggregated label data, and repeat the extracting of the second features, the training and the processing, based on the aggregated label data, until receiving a positive user feedback.

5. The computerized system according to claim 4, wherein the PMC is configured to, upon receiving a positive user feedback on the first segmentation map, include the first training sample into the training data.

6. The computerized system according to claim 5, wherein the PMC is further configured to obtain a second training image and second labels respectively associated with a group of pixels selected in each of one or more segments identified by a user from the second training image, the second labels being added to the aggregated label data, extract a set of features characterizing the second training image and including the first features and the second features, train the ML model using the aggregated label data, values of pixels associated with the aggregated label data, and the feature values of each feature of the set of features corresponding to the pixels associated with the aggregated label data, and performing the processing and determining based on the second training image.

7. The computerized system according to claim 1, wherein at least one of the one or more segments correspond to one or more structural elements presented in the first training image.

8. The computerized system according to claim 1, wherein the first features include texture features extracted by:
   processing the first training image with a set of filters, giving rise to a set of feature responses, each comprising feature response values corresponding to respective pixels of the first training image, wherein each pixel corresponds to a feature vector including a set of feature response values thereof;
   clustering the feature vectors corresponding to the pixels in the first training image into a plurality of clusters;
   assigning, for each pixel, a feature value according to the cluster to which the feature vector thereof belongs, giving rise to a feature map comprising feature values corresponding to pixels of the first training image, the feature map separable into a plurality of channels corresponding to respective feature values; and
   sampling each channel of the feature map using a sampling filter, giving rise to a feature map with a plurality of sampled channels.

9. The computerized system according to claim 8, wherein the first features further include intensity features extracted by: clustering pixel values of the first training image into a plurality of clusters, assigning, for each pixel, a feature value according to the cluster to which the pixel value belongs, giving rise to a feature map separable to a plurality of channels corresponding to respective feature values, and sampling each channel of the feature map using a sampling filter, giving rise to a feature map with a plurality of sampled channels.

10. The computerized system according to claim 8, wherein the set of filters comprises one or more of the following: derivative filters, Gabor filters, and Laplacian filters.

11. The computerized system according to claim 1, wherein the second features are extracted by calculating a statistical measure for the group of pixels in each segment, and for each pixel in the first training image, calculating a corresponding feature value as a distance between a value of the pixel and the statistical measure of each segment, giving rise to one or more feature maps, each comprising feature values corresponding to distances between pixel values and the statistical measure of a respective segment.

12. The computerized system according to claim 1, wherein the PMC is further configured to use the DNN training data to train the DNN, and validate the trained DNN using a validation set of images.

13. A computerized method for generating training data for training a Deep Neural Network (DNN training data) usable for examination of a semiconductor specimen, the method performed by a processor and memory circuitry (PMC) and comprising:

obtaining a first training image of the semiconductor specimen, and first labels respectively associated with a group of pixels selected in each of one or more segments identified by a user from the first training image, the first labels provided as partial label data of the first training image;

extracting a set of features characterizing the first training image, each feature having feature values corresponding to pixels in the first training image, the set of features including first features indicative of contextual information in the first training image, and second features informative of pixel distribution in the first training image relative to a statistical measure of the group of pixels in each segment;

training a machine learning (ML) model for image segmentation using the first labels, values of the group of pixels selected in each segment, and the feature values of each feature of the set of features corresponding to the group of pixels in each segment;

processing the first training image using the trained ML model to obtain a first segmentation map informative of predicted labels associated with respective pixels in the first training image, each predicted label indicative of a segment to which a respective pixel belongs; and determining to include a first training sample comprising the first training image and the first segmentation map into the DNN training data upon a criterion being met, wherein the first segmentation map is used as full label data of the first training image.

14. The computerized method according to claim 13, wherein the criterion is based on a user feedback on the first segmentation map, and the method further comprises: upon receiving a negative user feedback on the first segmentation map, obtaining additional first labels associated with an additional group of pixels in at least one of the segments, the first labels and the additional first labels constituting aggregated label data, and repeating the extracting of the second features, the training and the processing based on the aggregated label data until receiving a positive user feedback.

15. The computerized method according to claim 14, further comprising, upon receiving a positive user feedback on the first segmentation map, including the first training sample into the training data.

16. The computerized method according to claim 13, wherein the first features include texture features extracted by:

processing the first training image with a set of filters, giving rise to a set of feature responses each comprising feature response values corresponding to respective pixels of the first training image, wherein each pixel corresponds to a feature vector including a set of feature response values thereof;

clustering the feature vectors corresponding to the pixels in the first training image into a plurality of clusters;

assigning, for each pixel, a feature value according to the cluster to which the feature vector thereof belongs, giving rise to a feature map comprising feature values corresponding to pixels of the first training image, the feature map separable into a plurality of channels corresponding to respective feature values; and sampling each channel of the feature map using a sampling filter, giving rise to a feature map with a plurality of sampled channels.

17. The computerized method according to claim 16, wherein the first features further include intensity features extracted by: clustering pixel values of the first training image into a plurality of clusters, assigning, for each pixel, a feature value according to the cluster to which the pixel value belongs, giving rise to a feature map separable into a plurality of channels corresponding to respective feature values, and sampling each channel of the feature map using a sampling filter, giving rise to a feature map with a plurality of sampled channels.

18. The computerized method according to claim 13, wherein the second features are extracted by calculating a statistical measure for the group of pixels in each segment, and for each pixel in the first training image, calculating a corresponding feature value as a distance between a value of the pixel and the statistical measure of each segment, giving rise to one or more feature maps each comprising feature values corresponding to distances between pixel values and the statistical measure of a respective segment.

19. The computerized method according to claim 13, further comprising using the DNN training data to train the DNN, and validating the trained DNN using a validation set of images.

20. A non-transitory computer readable storage medium tangibly embodying a program of instructions that, when executed by a computer, cause the computer to perform a method of generating training data for training a Deep Neural Network (DNN training data) usable for examination of a semiconductor specimen, the method comprising:

obtaining a first training image of the semiconductor specimen, and first labels respectively associated with a group of pixels selected in each of one or more segments identified by a user from the first training image, the first labels provided as partial label data of the first training image;

extracting a set of features characterizing the first training image, each feature having feature values corresponding to pixels in the first training image, the set of features including first features indicative of contextual information in the first training image, and second features informative of pixel distribution in the first training image relative to a statistical measure of the group of pixels in each segment;

training a machine learning (ML) model for image segmentation using the first labels, values of the group of pixels selected in each segment, and the feature values of each feature of the set of features corresponding to the group of pixels in each segment;

processing the first training image using the trained ML model to obtain a first segmentation map informative of predicted labels associated with respective pixels in the first training image, each predicted label indicative of a segment to which a respective pixel belongs; and determining to include a first training sample comprising the first training image and the first segmentation map into the DNN training data upon a criterion being met, wherein the first segmentation map is used as full label data of the first training image.

* * * * *